Figure 1:
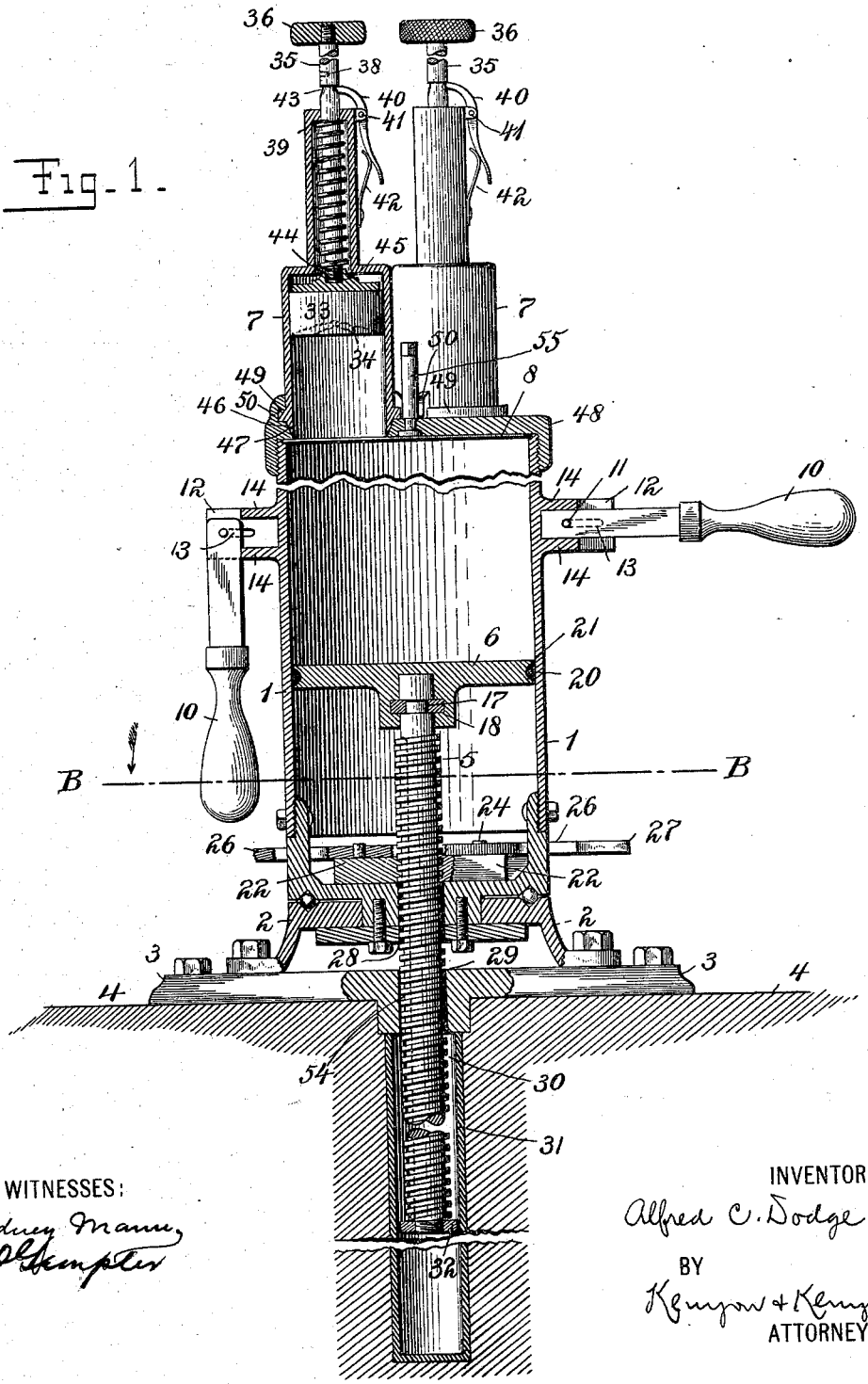

No. 734,680. PATENTED JULY 28, 1903.
A. C. DODGE.
MACHINE FOR MOLDING BUTTER.
APPLICATION FILED AUG. 25, 1899.
NO MODEL. 3 SHEETS—SHEET 1.

WITNESSES:
Sidney Mann
J. O. Hempler

INVENTOR
Alfred C. Dodge
BY
Kenyon & Kenyon
ATTORNEYS

No. 734,680. PATENTED JULY 28, 1903.
A. C. DODGE.
MACHINE FOR MOLDING BUTTER.
APPLICATION FILED AUG. 25, 1899.
NO MODEL. 3 SHEETS—SHEET 2.
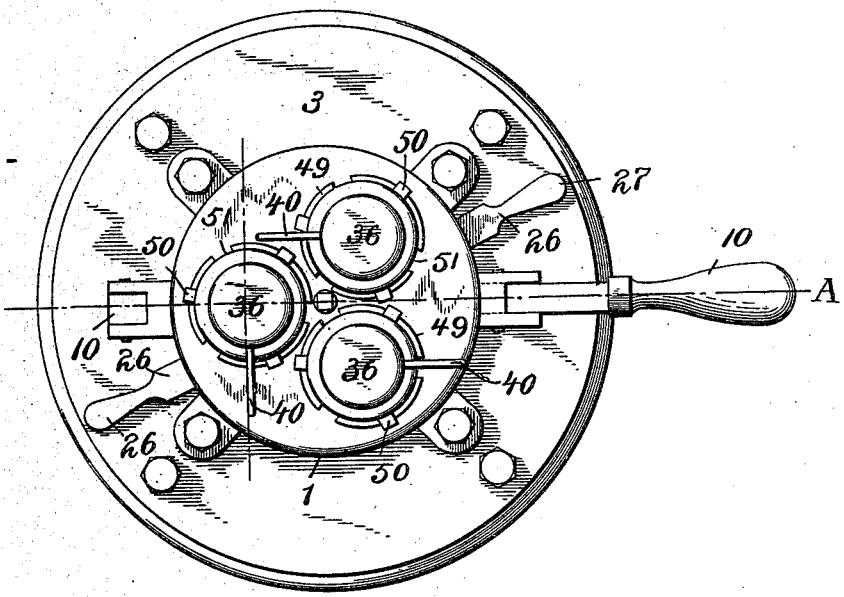
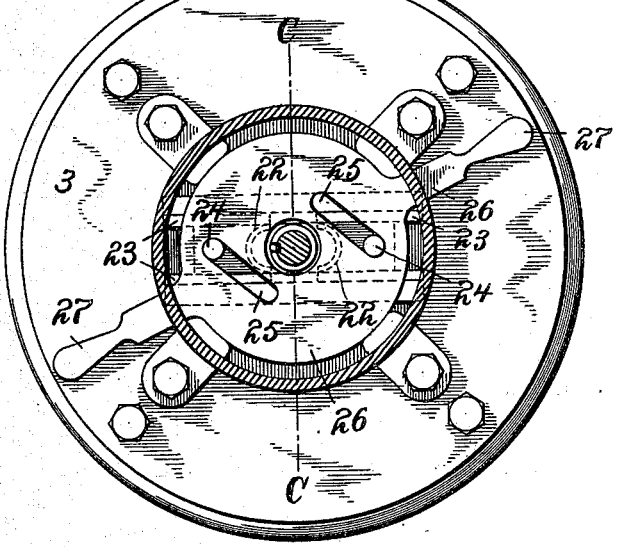
WITNESSES:
INVENTOR
Alfred C. Dodge
BY
Kenyon & Kenyon
ATTORNEYS No. 734,680. PATENTED JULY 28, 1903.
A. C. DODGE.
MACHINE FOR MOLDING BUTTER.
APPLICATION FILED AUG. 25, 1899.
NO MODEL. 3 SHEETS—SHEET 3.
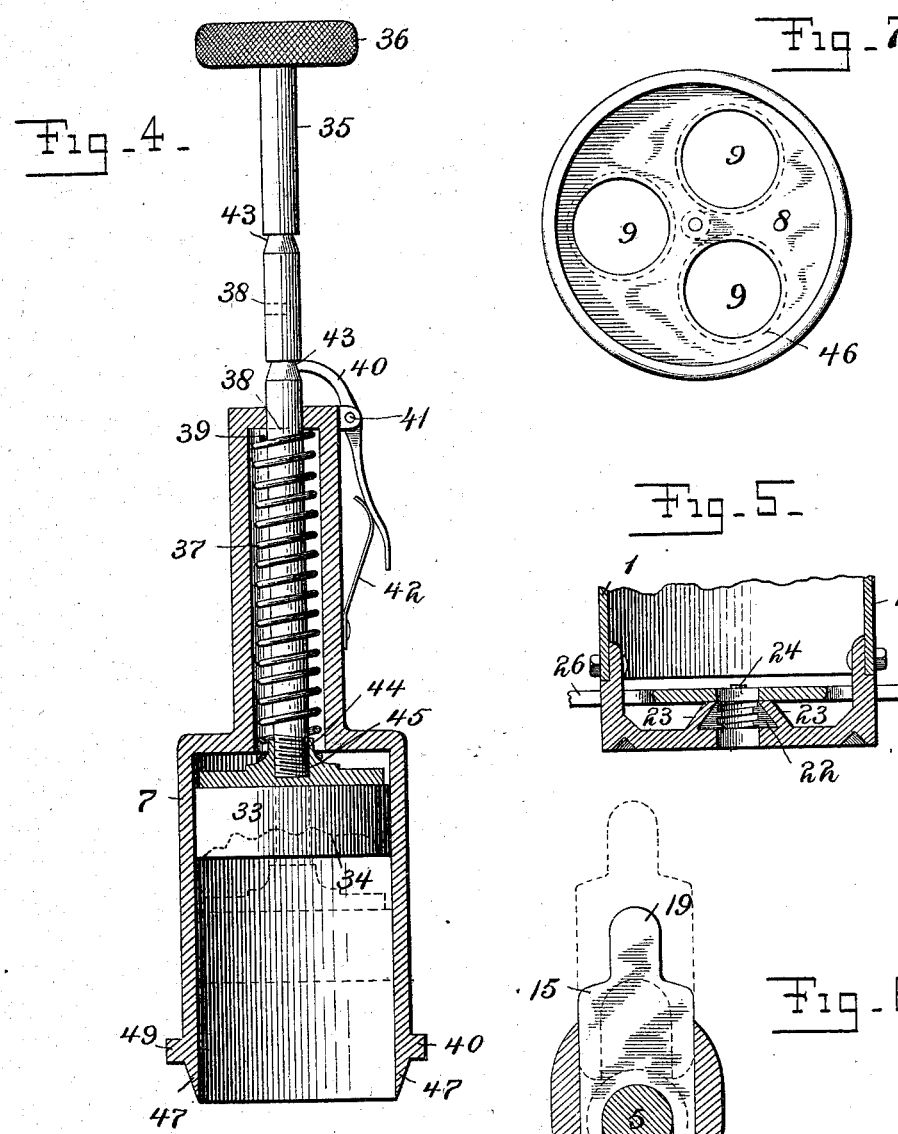
WITNESSES:
INVENTOR
Alfred C. Dodge
BY
Kenyon & Kenyon
ATTORNEYS No. 734,680. Patented July 28, 1903.

UNITED STATES PATENT OFFICE.

ALFRED C. DODGE, OF BINGHAMTON, NEW YORK.

MACHINE FOR MOLDING BUTTER.

SPECIFICATION forming part of Letters Patent No. 734,680, dated July 28, 1903.

Application filed August 25, 1899. Serial No. 728,396. (No model.)

*To all whom it may concern:*

Be it known that I, ALFRED C. DODGE, a citizen of the United States, and a resident of Binghamton, in the county of Broome and State of New York, have invented a new and useful Improvement in Machines for Molding Butter, of which the following is a specification.

My invention relates to machines for molding butter.

It has for its object to provide machines that can be successfully employed in practical use in making molds of butter; also, to improve the means for operating butter-molding machines, to make their operation easier, and to increase the power of such machines; also, to diminish the space occupied by such machines; also, to prevent leakage or loss of butter or buttermilk; also, to make the mold of butter more regular and compact and to make them of a predetermined size or weight; also, to provide a new and improved mold for shaping butter; also, to provide an improved removable and replaceable mold and to improve the means for securing the same in connection with the butter-receptacle and for removing it therefrom; also, to provide improved means for removing the butter from the mold without loss of butter or destruction or disfigurement of the butter mold or the print thereon; also, to provide means for adjusting molds to make molds of butter of different sizes or weights; also, to adjust the molds to adapt them to varying qualities or densities of butter; also, to provide an improved cutter for severing butter in the molds from the butter remaining in the butter-receptacle; also, to provide a new and improved piston easily removable from the piston-rod for the purpose of cleaning or for other purposes and easily replaceable thereon and new and improved means for making the piston rotatable on the piston-rod and for securing it thereto; also, to provide means for preventing the piston-rod from rusting and for cushioning the fall of the piston and piston-rod when released; and generally to provide a new and improved butter-molding machine which can be easily operated, which is simple in construction, certain in operation, which contains no place for the lodgment and retention of butter, and the parts of which can be easily taken apart and put together for the purposes of cleaning or for other purposes.

It consists of the novel devices herein shown and described.

In the drawings accompanying this specification and forming part hereof, and in which similar reference characters in the different views represent corresponding parts, I have shown and will now proceed to describe the preferred form or embodiment of my invention.

Figure 1 is a vertical longitudinal section of a machine for molding butter containing one form or embodiment of my invention, the section being taken on the lines A A, Fig. 2. Fig. 2 is a plan of the same with one handle removed. Fig. 3 is a horizontal section of the same, taken on the lines B B of Fig. 1, viewed as shown by the arrow. Fig. 4 is a detail vertical section of one of the molds. Fig. 5 is a vertical section through the nut and its connections, taken on the lines C C of Fig. 3. Fig. 6 is a view of the locking-piece for locking the piston to the piston-rod, and Fig. 7 is a plan of the rotary cutter.

Referring now to the embodiment of my invention shown in the drawings, 1 is the receptacle for receiving the butter, that is preferably rotatable upon its axis, but immovable longitudinally. In the form shown in the drawings it is mounted by means of ball-bearings upon framework 2, bolted by means of plate 3 to the floor 4.

5 is a screw-threaded piston-rod carrying piston 6.

7 represents the molds for shaping the butter. The piston-rod and butter-receptacle are arranged so as to have longitudinal motion relative to each other. In the form shown in the drawings the piston-rod 5 moves longitudinally in butter-receptacle 1, causing piston 6 to force the butter above it in the receptacle into the molds. A feather 54, projecting from plate 3 and taking into a groove in piston-rod 5, prevents the latter from rotating. I provide a suitable cutter for severing the butter in the molds from that remaining in the receptacle. In the form shown in the drawings the cutter is a rotary cutter 8, arranged between the butter-receptacle and the molds, and is provided with a series of concentric openings 9 of the same size as the openings in the molds. Any suitable means for operating the cutter may be employed; but I prefer means for operating it from the outside of the casing, as will be presently described. The molds are preferably removable from and replaceable in the machine and are connected with it by mechanism presently to be described, so as to form a perfectly-tight connection to prevent the leakage of butter or buttermilk. The means for ejecting the butter from the mold will be presently described.

By rotating the butter-receptacle piston-rod 5 and piston 6 are caused to move longitudinally within it and to force the butter into the molds, after which the butter in the molds is separated from the butter remaining in the receptacle by means of the cutter. The molds are then removed from the machine and the butter ejected therefrom. The mechanism for accomplishing this will be presently described.

For some features of my invention it is not necessary that the butter-receptacle rotate. In the preferred form, however, it rotates.

The means for rotating the butter-receptacle, shown in the form of my invention disclosed in the drawings, consist of handles 10. I provide means for holding these handles at right angles to the butter-receptacle and for dropping them down when desired parallel to the butter-receptacle, so that the handles will be out of the way when the machine is not in use. The above means for holding handles at right angles and for permitting them to be dropped down consist of a pin 11, projecting from both sides of the handles near their inner ends, a bracket 12, projecting from the sides of the butter-receptacle, each bracket having two slots 13 in its sides, in which pin 11 is adapted to slide. Each bracket is provided with a part 14, along which the inner part of the handle slides when pin 11 is pushed inward along slot 13. In the form shown there are two parts 14 in each bracket, the two parts together forming a pocket. When the handles are pushed inward, their inner ends slide into the pockets formed by the parts 14, and they are held rigidly at right angles to the butter-receptacle and can be used for rotating that receptacle. When pulled outward, they can be lowered parallel to the butter-receptacle. The piston 6 is preferably made rotatable upon piston-rod 5 and removable and replaceable thereon. The preferred means for accomplishing this consist of a locking-piece 15, which has arms 16 16, which are adapted to enter into a groove 17 in the piston-rod and a groove 18 in the piston to lock the two parts together and at the same time be loose enough to permit the rotation of the piston upon the piston-rod. The locking-piece is provided with a short handle 19, of such a length that when the locking-piece is pushed into the grooves of the piston-rod and piston, as shown in full lines in Fig. 6, the short handle 19 does not touch the sides of the butter-receptacle; but the handle is long enough to prevent the removal of the locking-piece except when the piston is moved out of the end of the butter-receptacle. The latter I accomplish by making the piston-rod 5 and butter-receptacle 1 of such a length that when the piston-rod is moved to one limit of its motion piston 6 will project from the end of the butter-receptacle 1. In this position of the parts the locking-piece can be removed and replaced and the piston removed for cleaning or other purposes and be replaced. By these means the piston can be easily and quickly removed and replaced in position, and it will be at all times free to rotate upon the piston-rod.

The piston must fit inside the butter-receptacle so tightly that neither butter nor buttermilk can ooze or squeeze past the periphery of the piston. To prevent such escape or leakage, I place suitable packing 20 around the periphery of the piston. In its preferred form this packing is placed in a curved peripheral receptacle 21 in the piston, adapted to receive and hold a strip of packing material when wound therein, and consists of a strip of suitable packing material which is wound in said receptacle. In practice I find a packing that is adapted to swell is best suited for the purpose, and I prefer to use twine or string which will swell when wet, as I find that this forms a thoroughly tight packing and prevents escape or leakage of butter or buttermilk past the piston.

The piston-rod and butter-receptacle may be moved relatively to each other longitudinally of the butter-receptacle by any suitable means in order to cause the piston to force the butter into the molds. I prefer in practice to move the piston-rod in the butter-receptacle and to do it by the following-described means: The piston-rod is preferably made screw-threaded, as shown in Fig. 1, and a nut secured to the butter-receptacle and composed of parts adapted to close together to engage with the screw-threaded rod and to open to release the piston-rod, imparts longitudinal motion to the piston-rod due to the rotation of the butter-receptacle. In the form shown in the drawings the nut consists of two parts 22 22, moving in slots 23 in the lower part of the case of the butter-receptacle and each having a pin 24 projecting into a slot 25 25 in a cam-plate 26. Slots 23 have inclined sides, as shown in Fig. 5, to prevent nut 22 from rising. This cam-plate has an opening through which piston-rod 5 freely passes and is free to swing horizontally within certain limits. Handles 27 27 project from this cam-plate, by means of which the plate is turned. As the handles 27 27 are moved one way or the other the cam-plate, by means of the cam-surfaces of its slots 25, through pins 24, moves the parts 22 22 of the nut together, so as to engage the screw-threaded piston-rod 5, or opens them, so as to release the piston-rod. When the parts of the nut are closed together, the rotation of the butter-receptace moves the piston-rod and piston longitudinally in the butter-receptacle. By separating the parts of the nut the piston-rod and piston and their connections, in the form of my device shown in the drawings, where the butter-receptacle is vertical, are allowed to drop downward. This affords a speedy way of restoring these parts to their normal position.

My improved machine is especially designed for making molds of butter of comparatively large size—that is, from one-half pound up to ten pounds—as distinguished from small pats of butter intended for table use. For molds of such size it is preferable to have a machine of considerable size and power, like that shown in the drawings.

In the preferred form of my machine the butter-receptacle is vertical, and as in such form the butter is usually put into the receptacle at the top I find it preferable to reduce the height of the machine by the following-described means: For this purpose I preferably provide an opening in the butter-receptacle and its support and also an opening in the floor and cause the piston-rod 5 to pass through these openings and to extend beneath the flooring. 28 is the opening in the butter-receptable and its support, and 29 is the opening in plate 3, and 30 the opening in the flooring through which the piston-rod extends. I preferably provide a chamber 31 in the flooring beneath the said openings and in line with them, making this chamber slightly larger than the diameter of the piston-rod, and in this chamber I preferably place oil. By placing such a quantity of oil in this chamber as to fill the same when the piston-rod is lowered to its full extent all parts of the piston-rod in the chamber are oiled, and thus prevented from rusting. I also preferably place a screw-cap 32 at the lower end of the piston-rod. This is made to fit the chamber, so as to form a piston, and by any suitable means, as by making the fitting a loose one, as shown, the oil or other fluid in the chamber is permitted to escape in a relatively slow manner from one side of the piston to the other. In this way the fall of the piston-rod and piston and connections when released by the nut is cushioned. Of course for this purpose any suitable fluid may be used in the chamber 31.

One or any suitable number of molds may be used in connection with my improved machine. I have shown three molds in the form of machine shown in the drawings. Each of these molds is provided with a plunger 33, in the face of which, if desired, is preferably placed an imprint 34 of any design desired to be printed upon the butter. The surface of this plunger, which comes in contact with the butter, I make of a substance to which butter is not inclined to cling. I find the best substance for this purpose to be plaster-of-paris. This substance is well adapted to take any form of design to be imprinted upon the butter, and when the butter is forced out of the mold the butter readily leaves the mold without leaving any of the butter clinging to the surface of the plunger and without any disfigurement or destruction of the design imprinted upon the butter. Other substances may be used—such, for example, as any suitable wood when properly treated or stone where very little pressure is needed and where the butter is soft—but both wood and stone are entirely impractical for use in butter-molding machines where great pressure is to be exerted on the butter or where the butter is hard. Neither wood nor stone nor any other substances of which I am aware is as desirable for this purpose as plaster-of-paris.

Great difficulty has heretofore been encountered in removing butter molds from the molds in which they are formed without the clinging of more or less of the butter to the face of the mold or plunger and the disfigurement or destruction of any impression printed upon the butter. This has been one of the most serious obstacles in the successful use of butter-molding machines. By the use of plaster-of-paris this difficulty is entirely overcome.

Up to the time of my invention, so far as I am aware, plaster-of-paris had not been known or used for any part of a butter-molding machine, and certainly not for the surface of the plunger of a mold. In practice to obtain the best results the surface of the plaster-of-paris should be moistened, and for this purpose I dip the plunger in water before commencing the operation of forcing the butter into the mold. During the subsequent operation the moisture in the butter keeps the plaster-of-paris surface sufficiently moistened.

The molds may be made in any suitable form. In the form shown in the drawings the plunger 33 is mounted upon a piston-rod 35, which fits snugly into an opening in the upper end of mold 7 and is provided at its upper end with a thumb-piece 36. A spring 37 tends to keep the plunger at the lower part of the mold or at the end nearer the butter-receptacle. The butter is forced into the mold against the pressure of this spring, which tends to make the molds more regular and compact. It is sometimes desirable to relieve the printed mold of butter from the pressure of the spring while still in the mold. For this purpose I provide a stop 40, fulcrumed at 41, and having a spring 42, pressing against its other end and tending to hold tt against piston-rod 35.

43 43 are cut-away portions in the piston-rod 35, in which stop 40 catches, thus holding the piston-rod up and relieving the printed butter-mold from the pressure of the spring. The piston-rod can be released by pressing with the thumb on the lower end of lever-stop 40.

In order to make molds of different sizes— as, for instance, two-pound, pound, half-pound, and so on—I provide openings 38 38 at different predetermined positions in piston-rod 35 and place an adjustable stop 39 in one of such openings. This adjustable stop is arranged so as to strike the inner surface of the mold at the top, as shown in Fig. 4, when the plunger is raised to the desired position in the mold. By shifting the adjustable stop 39 from one opening to the other the length of stroke of the plunger is varied, and the size or weight of the mold of butter is thus readily varied. As shown, adjusting-stop 39 is made so that its outer end clears spring 37 as the piston-rod is pushed downward or pulled upward. By these means molds of butter of any desired size or weight may be made in the same mold.

Inasmuch as butter varies greatly in quality, character, and density and as a mold of given size would accordingly with different kinds of butter make molds of slightly-varying weight, I preferably provide means for adjusting the length of the piston-rod between stop 39 and the face of the plunger, so as to compensate for the said difference in quality and density of the butter by varying the size of the operative part of the mold. This may be accomplished in any suitable manner. In the form shown in the drawings I accomplish it by making the lower end of the piston-rod 35 screw-threaded, as at 44, and provide a screw-threaded opening 45 therefor in the plunger. If the quality or density of the butter is such that a pound will occupy less space, I turn thumb-piece 36 so as to cause the screw-threaded end 44 of the piston-rod to enter a little less deeply into said opening 45. If the butter is of opposite character, I turn screw-thread 36 in the opposite way. In this manner the size of the operative part of the mold may be very delicately adjusted.

It is of the utmost importance that the molds be connected with the butter-receptacle so that butter or buttermilk cannot escape at the points of junction. This forms one of the great obstacles in the way of the successful use of a butter-molding machine for forming molds of butter. In my improved machine these connections are made so tight that no butter or buttermilk can escape. The preferred form of such connections is shown in Fig. 1. For this purpose the opening in each mold is of exactly the same size as the openings 9 in the rotary cutter. The walls of the mold extend down to said openings and on their exterior are beveled, as at 46, and are adapted to be pressed against a beveled seat 47 of a cap 48, screwed upon the top of the butter-receptacle and forming part thereof. I provide means for locking said beveled ends against the seat and for unlocking them. These means, as shown, consist of ribs 49 upon the molds, adapted to take into grooves in projections 50 from cap 48. The ribs 49 are so arranged that there are openings 51 between the ribs of slightly-larger size than the projections 50. The molds are placed in position by placing the openings 51 over the projections 50, pushing down the molds until ribs 49 are in line with the groove in the projections, and then turning the mold. Ribs 49 may be inclined to further aid in tightening the joints. The molds are removed by turning the mold so as to bring openings 51 in line with projections 50, when the molds may be readily removed.

The cutter in the form shown in the drawings is mainly supported and is turned by post 55, which passes through cap 48 and is secured to the cutter. The diameter of the post is greater above the cap than elsewhere, thus forming a shoulder which rests upon cap 48. Cutter 8 is also partially supported by its periphery extending into a groove in the inside walls of the butter-receptacle, as shown in Fig. 1. This tends also to make tighter the joint between the cap and the receptacle and also avoids any crevice in which butter might lodge.

I am aware that attempts have been made to force butter into molds by means of a piston working in a butter-receptacle and forcing the butter into molds, and that in one such attempt the butter-receptacle was caused to rotate. None of these attempts have, so far as I have been aware, been successful in producing an operative machine that could make butter-molds of any size in a practical or successful manner, especially when molds of any size larger than pats are to be made. None of these machines have succeeded in preventing the escape of butter or buttermilk from the machine while in operation. In none of them is there a piston which is caused to move longitudinally in a butter-receptacle by means of the rotation of the butter-receptacle, and none of them disclose a plunger for a mold whose surface is made up of a substance to which butter is not inclined to cling or whose surface is made of plaster-of-paris, and none of them disclose the other features of my invention not above enumerated.

By means of my improved machine all of the obstacles above referred to in the way of successful butter-molding, which have heretofore been insuperable, are entirely overcome and butter can be molded into large molds or forms of a predetermined size or weight easily, quickly, without loss of butter or buttermilk, and without any clinging of the butter to the mold or any disfigurement or destruction of the design imprinted upon the butter, and all of the butter in the butter-receptacle can be forced into the molds.

The packing for the piston of the butter-receptacle above described has the advantage that being very cheap and easily removed and replaced by other packing it need be used but once. It is very difficult, if not impossible, to use packing in a butter-molding machine for any length of time, as the packing soon becomes foul from contact with the butter. The packing should be renewed at every new operation of the machine.

Many modifications in addition to those heretofore recited can of course be made from the form of devices shown in the drawings without departing from my invention.

What I claim as new, and desire to secure by Letters Patent, is—

1. In a machine for molding butter, the combination of a receptacle for the butter rotatable upon its axis but immovable longitudinally, means for rotating it, a piston-rod adapted to move longitudinally in the butter-receptacle, a piston carried by the piston-rod, suitable packing upon the periphery of the piston, means actuated by the rotation of the butter-receptacle for imparting longitudinal motion to the piston-rod, a mold connected with the butter-receptacle, a rotary cutter between the butter-receptacle and the mold provided with an opening of the same size as the opening of the mold, means for rotating the cutter for severing the butter forced into the mold from that remaining in the butter-receptacle, and means for removing the butter from the mold, whereby molds of butter may be formed.

2. In a machine for molding butter, the combination of a butter-tight receptacle for the butter mounted upon suitable framework but immovable longitudinally of the receptacle thereon, suitable framework therefor adapted to be secured to the flooring, a piston-rod adapted to move longitudinally in the butter-receptacle and adapted to pass through openings in the framework and flooring, a liquid-tight cylindrical chamber in the flooring in line with the said openings larger than the diameter of the piston-rod and adapted to receive the piston-rod and to hold oil, a piston carried by the piston-rod, means for moving the piston-rod longitudinally in the butter-receptacle and through the said openings and in the said chamber, whereby the space occupied by the machine is considerably reduced, a mold connected with the butter-receptacle, a cutter for severing the butter forced into the mold from that remaining in the butter-receptacle, whereby molds of butter may be formed in the machine.

3. In a machine for molding butter, the combination with a receptacle for the butter, means for forcing the butter into the mold and a cutter for severing the butter in the mold from that remaining in the butter-receptacle, of a mold for shaping the butter, a plunger therein adapted to move in the mold, a spring for normally holding the plunger at the end of the mold toward the butter-receptacle, and for automatically ejecting the butter from the mold when relieved from pressure on its opposite side, and means for relieving the plunger from the action of said spring, whereby molds of butter may be formed.

4. In a machine for molding butter, the combination with a receptacle for the butter, means for forcing the butter into the mold and a cutter for severing the butter in the mold from that remaining in the butter-receptacle, of a mold for shaping the butter, a plunger therein adapted to move in the mold, a spring for holding the plunger at the end of the mold toward the butter-receptacle, a stop adapted to engage with the plunger for holding it against the action of the spring, when the mold is filled, to remove the pressure of the spring from the butter, and means for moving the plunger to eject the butter from the mold, whereby molds of butter may be formed.

5. In a machine for molding butter, the combination with a receptacle for the butter, means for forcing the butter into the mold and a cutter for severing the butter in the mold from that remaining in the butter-receptacle, having an opening of the same size as the end of the opening in the mold and adapted in one position of the cutter to register with the opening of the mold, of a removable mold for shaping the butter having its walls extending to the said opening in the cutter and beveled on their exterior, a beveled seat for the beveled ends of the walls of the mold, means for locking said ends against the seat and for unlocking them, whereby the mold will be held firmly in contact with the said seat to prevent leakage of butter or buttermilk, a plunger in the mold, and means for moving the plunger in the mold to eject the butter, whereby molds of butter may be made without leakage of butter or buttermilk.

6. In a machine for molding butter, the combination with a receptacle for the butter, means for forcing the butter into molds, a plurality of removable molds for shaping the butter, a rotary cutter between the butter-receptacle and the molds provided with a plurality of concentrically-arranged openings of the same size as the openings of the molds, and adapted in one position of the cutter to register with the openings of the mold, means for rotating the cutter operated from the outside of the casing, each mold having its walls extend to the said opening in the cutter and beveled on their exterior, a beveled seat for the beveled ends of the walls of each mold, means for locking said ends against the seat and for unlocking them, whereby each mold will be held firmly in contact with the said seat and with the cutter to prevent leakage of butter or buttermilk, a plunger in each mold, and means for moving the plunger in each mold to eject the butter, whereby molds of butter may be made without leakage of butter or buttermilk.

7. In a machine for molding butter, the combination with a butter-tight receptacle for the butter, means for forcing the butter into the mold, and a mold for shaping the butter, of a rotary cutter between the butter-receptacle and the mold, and means for rotating the cutter to cause the cutter to sever the butter in the mold from that remaining in the receptacle.

8. In a machine for molding butter, the combination with a receptacle for the butter, means for forcing the butter into the mold, and a mold for shaping the butter, of a rotary cutter between the butter-receptacle and the mold provided with an opening of the same size as the opening of the mold, and means for rotating the cutter to cause the cutter to sever the butter in the mold from that remaining in the receptacle.

9. In a machine for molding butter, the combination with a receptacle for the butter, means for forcing the butter into the mold, and a mold for shaping the butter, of a rotary cutter between the butter-receptacle and the mold provided with an opening of the same size as the opening of the mold, and means adapted to be operated outside of the casing of the machine for rotating the cutter to cause the cutter to sever the butter in the mold from that remaining in the receptacle.

10. In a machine for molding butter, the combination with a receptacle for the butter, means for forcing the butter into the mold, and a plurality of molds for shaping the butter, of a rotary cutter between the butter-receptacle and the molds provided with a plurality of concentrically-arranged openings of the same size as the openings of the molds, and adapted in one position of the cutter to register with the openings of the mold, and means for rotating the cutter operated from the outside of the casing to cause the cutter to sever the butter in the molds from that remaining in the receptacle.

11. In a machine for molding butter, the combination of a receptacle for the butter rotatable upon its axis but immovable longitudinally, means for rotating it, a screw-threaded piston-rod adapted to move longitudinally in the butter-receptacle, a piston carried by the piston-rod, a nut composed of parts secured to the butter-receptacle, and adapted to close together to engage with the screw-threaded piston-rod to move the latter longitudinally in the cylinder and to open to release the piston-rod, a cam movably connected with the butter-receptacle and adapted to engage with a projection from each part of the nut and means for moving the cam for closing or opening the nut.

In testimony whereof I have signed my name to this specification in the presence of two subscribing witnesses.

ALFRED C. DODGE.

Witnesses:
ROBERT S. PARSONS,
E. B. HEMINGWAY.